United States Patent
Wurz

Patent Number: 5,268,011
Date of Patent: Dec. 7, 1993

[54] MIST ELIMINATOR

[76] Inventor: Dieter Wurz, Gartenweg 7, 7570 Baden-Baden, Fed. Rep. of Germany

[21] Appl. No.: 894,617

[22] Filed: Jun. 5, 1992

[30] Foreign Application Priority Data

Jun. 11, 1991 [DE] Fed. Rep. of Germany ....... 4119216

[51] Int. Cl.$^5$ ............................................. B01D 45/08
[52] U.S. Cl. ................................... 55/257.2; 55/440; 55/442; 55/DIG. 37
[58] Field of Search ................ 55/185, 186, 257.2, 55/440, 442–446, 464, 465, DIG. 37

[56] References Cited

U.S. PATENT DOCUMENTS

| | | | |
|---|---|---|---|
| 910,045 | 1/1909 | Donaldson | 55/440 X |
| 2,643,736 | 6/1953 | Smith | 55/440 |
| 3,358,580 | 12/1967 | Freese et al. | 55/442 X |
| 3,430,693 | 3/1969 | Egenvall | 55/444 X |
| 3,673,771 | 7/1972 | Dickey | 55/440 X |
| 3,771,430 | 11/1973 | Lane | 55/440 X |
| 3,805,496 | 4/1974 | Sokolowski | 55/440 |
| 3,849,095 | 11/1974 | Regehr | 55/440 X |
| 3,899,427 | 8/1975 | Connelly et al. | 55/440 X |
| 3,912,471 | 10/1975 | Cotton, Jr. | 55/464 X |
| 3,925,040 | 12/1975 | Fattinger | 55/257.2 |
| 3,950,156 | 4/1976 | Kall | 55/443 X |
| 3,953,183 | 4/1976 | Regehr | 55/440 |
| 4,053,292 | 10/1977 | Schneider et al. | 55/257.2 X |
| 4,175,938 | 11/1979 | Regehr et al. | 55/440 |
| 4,198,215 | 4/1980 | Regehr | 55/185 |
| 4,225,188 | 9/1980 | McGuire et al. | 55/440 X |
| 4,543,108 | 9/1985 | Wurz | 55/440 X |
| 4,557,740 | 12/1985 | Smith | 55/440 |
| 4,581,051 | 4/1986 | Regehr et al. | 55/464 X |
| 4,738,698 | 4/1988 | Holcblat | 55/440 |
| 4,802,901 | 2/1989 | Wurz et al. | 55/440 |

FOREIGN PATENT DOCUMENTS

| | | |
|---|---|---|
| 0330704 | 9/1989 | European Pat. Off. ............ 55/440 |
| 2347984 | 4/1975 | Fed. Rep. of Germany ........ 55/440 |
| 2628628 | 12/1977 | Fed. Rep. of Germany ........ 55/440 |
| 2642803 | 4/1978 | Fed. Rep. of Germany ........ 55/440 |
| 90058585 | 9/1990 | Fed. Rep. of Germany . |

*Primary Examiner*—Robert Spitzer
*Attorney, Agent, or Firm*—Laubscher & Laubscher

[57] ABSTRACT

A mist eliminator comprising baffles (2) having capture pockets (12, 16) for droplets to be eliminated from a solids-laden and/or liquid-laden gaseous flow, the mist eliminator being distinguished by the feature that each baffle (2) comprises at least two capture pockets (12, 16) which are disposed and configured in such a way that their orthogonal projection to the entrance plane (E) substantially spans the field of flow.

15 Claims, 6 Drawing Sheets

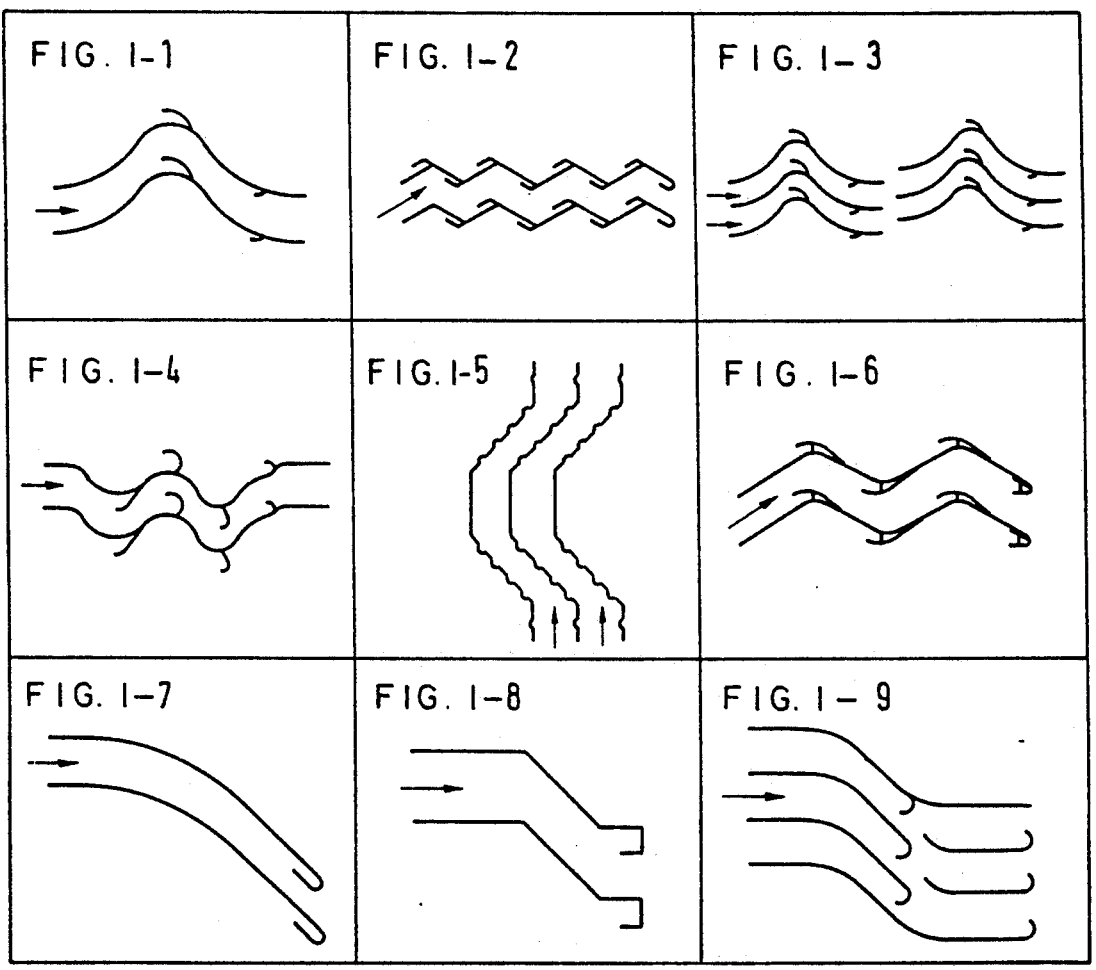

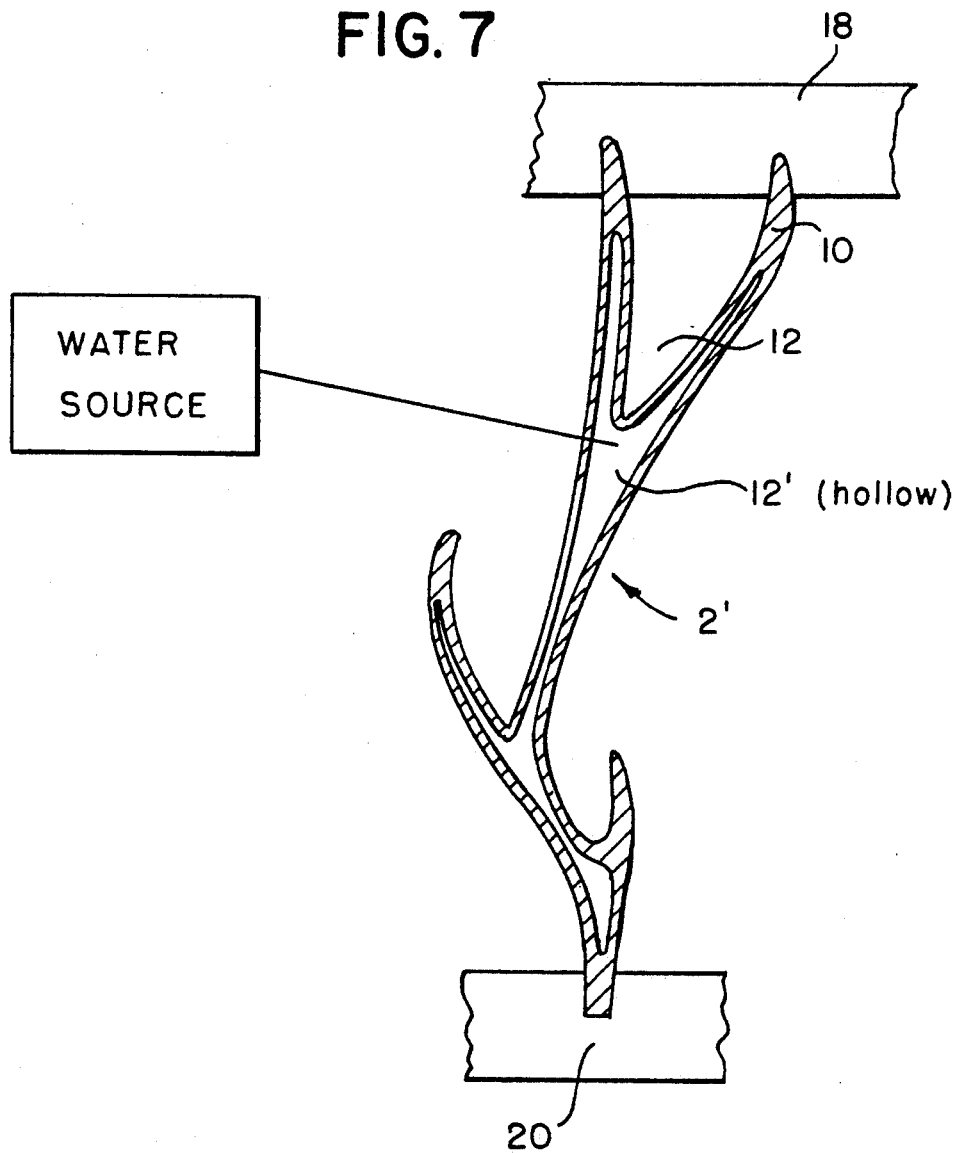

MIST ELIMINATOR

STATEMENT OF THE INVENTION

The present invention is directed to a mist eliminator comprising baffles formed with capture pockets for drops to be eliminated from a solids-laden or liquid-laden gaseous flow. Such mist eliminators are employed, for instance, in flue gas scrubbing plants.

BRIEF DESCRIPTION OF THE PRIOR ART

Various types of baffle-type mist eliminators are known in the prior art that include flow deflecting portions which are enforced by curved baffles, the droplets contained in the gaseous flow being "flung out" towards the baffle surfaces. The liquid films formed thereby flow along the baffle surfaces under the action of gravity into a collecting tank.

Whereas mist elimination normally does not pose any problems in the case of mere liquids, the elimination of solid suspensions is accompanied by serious difficulties. Suspended solids as well as dissolved matter precipitated upon evaporation of the carrier liquid may grow—promoted by chemical reactions—to form hard and closely adhering deposits on the mist eliminator. Such deposits may seriously impede the operation of the mist eliminator. Whereas very thin coats (a few tenths of a millimeter) may even improve elimination due to increased roughness of the surface and improved wettability, thicker coats will not only cause considerable pressure loss but will affect the mist eliminator to even result in serious trouble causing frequent shut-down, so that expensive cleaning of the baffles can be performed during the shut-down period.

It has been attempted to prevent the formation of deposits or incrustations by flushing the mist eliminator at predetermined time intervals with make-up water from the process and sometimes also with suspension filtrate. When make-up water is used, the quantity of flushing water must not exceed certain limits so as not to impair the balance of process water.

Mist eliminating baffles of the prior art are employed in the scrubbing towers of flue gas desulfurizing plants for the separation of solids-containing suspensions. The front capture pocket has less tendency towards incrustations because both the absorber suspension droplets striking thereagainst and the approaching flushing liquid jet are applied with high intensity so that the pocket is cleaned thereby. But upstream of the smaller rear capture pocket considerable deposits are normally formed even after a relatively short operating period so that the rear capture pocket can no longer operate properly. This is due to the fact that the deposited incrustation cannot be reached—or at least cannot be reached directly—by the flushing liquid jet and that moreover this region is reached predominantly by small droplets which on account of partial evaporation have a higher solids content than the larger droplets.

SUMMARY OF THE INVENTION

A primary object of the present invention is to provide a mist eliminator which, while performing optimum and inexpensive mist elimination, is adapted to be cleaned substantially better than the previously known mist eliminators even while the plant is operating. In particular, it is desired that all areas which perform an eliminating action and tend to be incrusted should be reached direct, if possible, by the flushing liquid at high impetus, i.e. not only after an impetus-consuming shock interaction with upstream baffle sections. Of course, the primary objective of achieving optimum and inexpensive mist elimination at minimum pressure loss must not be affected, at least not unduly, by the improved cleaning efficiency.

The novel baffle configuration according to the invention has the effect that the droplets entering the baffles penetrate deeply into the capture pockets in direct flight, i.e. without previously forming liquid films along the baffle walls, and nearly all of them are captured at the pocket bottoms and thence drain off due to the action of gravity on account of an inclined or vertical arrangement of the baffles. Even droplet fragments which are formed on impact at the pocket bottom can no longer escape from the capture pocket. The capture pockets can be cleaned in a very simple way by means of a flushing jet from the entry side of the mist eliminator.

In accordance with an advantageous embodiment of the invention each baffle has a front end portion that extends forwardly beyond the entrance tip of the adjacent pocket in opposition to the direction of approaching flow a distance $l_1$ (FIG. 2) that is from 0.5T to 2T based on the pitch or center distance T between adjacent baffles. Thereby an alignment of the gaseous flow is caused. In particular the large droplets which due to their high inertia are unable to adapt sufficiently quickly to the direction imposed on the gaseous flow and which still enter the mist eliminator obliquely will strike the baffle walls already here, either from the right or from the left depending on their flight direction. Droplet fragments formed thereby which splash back from the surface and comprise a relevant percentage of the original mass of the large drop, are to be prevented from being carried along into the rear passage between adjacent eliminator baffles, which passage is hard to clean. This is achieved by the fact that the flow through the first capture pocket is directed towards the bulging side of the main baffle so that these small droplet fragments may be eliminated either on the baffle itself or in the subsequent second capture pocket. If due to an excessively short baffle the large drops struck the back of the first capture pocket or struck the baffle only shortly before the second capture pocket, a far too large proportion of drop fragments would initially be carried towards the outside of the first capture pocket and then into the rear area of the baffle. If there is no further capture pocket provided at said location, this liquid quantity will reach the exit of the mist eliminator and hence cannot be subjected to elimination. If a further, small capture pocket opening towards the entry of the mist eliminator were provided at the exit side so as to avoid the specified disadvantage and to drain off said liquid, problems would result in respect of cleaning said capture pocket: from the rear it cannot be reached by a flushing jet, and from the front it can be reached only under conditions which detrimentally affect a configuration of the mist eliminator adapted to achieve efficient elimination.

However, in spite of a forwardly projecting front portion of the baffle it cannot be completely prevented that a small portion of droplets is charged into the rear area of the baffles. In case of high demands on the degree of mist elimination it may be necessary also to eliminate this small portion. This is effected by the further improvement of the invention, where at least one final blade per baffle is provided on the exit side. The liquid which reaches the back of a baffle may pass through the constriction between baffle and final blade: at the same time some flue gas will also flow therethrough. Behind each constriction the passage between baffle and final blade expands to such an extent that the gas velocity is greatly retarded (e.g. from 10 ms$^{-1}$ to about 1 ms$^{-1}$) and the liquid in this quiescent space may drain off under the action of gravity. Advantageously, the final blades are fixed via the spacer member on the exit side or joined to the baffle through spacer members. It is one of the essential advantages of this design that the quiescent space in which the eliminated liquid quantity is discharged can be cleaned optimally with a flushing jet from the exit side of the mist eliminator.

In another embodiment of the invention a somewhat smaller second final blade is provided so that even the small amount of water which reaches the outside of the first final blade will be eliminated.

In accordance with a further, easy-to-clean embodiment of the just described configuration the two final blades belonging to each baffle are profiled and inclined in such a way that the cross-section of the main flow passage between two adjacent final blades tapers in nozzle-like fashion towards the exit. The pressure distribution generated thereby with adapted dimensioning will cause a small gaseous flow to pass through the constrictions between the final blades and the main baffle to thereby transport the liquid film into the quiescent space between the final blades and the baffle whence it may drain off smoothly under the action of gravity. In this case the spacer member should be designed so as not to impede draining of the liquid film.

Another advantage of the novel configuration resides in that with equal baffle lengths at a centre distance T of about 40 mm it is still possible to achieve degrees of elimination which are equal to or better than with conventional systems at a centre distance T of about 30 mm. Irrespective of the provision of a secondary baffle or of two final blades for each baffle the material consumption for the novel, easy-to-clean mist eliminator is not higher than with conventional mist eliminators, which is due to the greater centre distance achievable between adjacent baffles.

In accordance with a further embodiment of the present invention, the baffles are designed as hollow sections or profiles. Due to the fact that water at a temperature slightly below the dew point of the flue gas is applied to the hollow spaces within the baffles, a wall condensate film is produced which may have excellent cleaning effect. The water balance of the process is only slightly loaded thereby, because it is not the entire amount of flue gas but only a flow interface near the baffle which is cooled. Apart from that, the saving in flushing water for the mist eliminator should more than compensate the amount of condensate. This condensate flushing of the baffles has, of course, only become possible due to the fact that the condensate films—insofar as they are created downstream of the capture pocket openings—are driven by the shear stress of the gaseous flow towards the rear edge of the baffles and can be discharged in the region of the rear edges in an apparatus according to the present invention.

BRIEF DESCRIPTION OF THE DRAWINGS

The invention will be described in detail with reference to schematic drawings and a table, in which:

FIGS. 1-1 through 1-9 illustrate diagrammatically a number of known types of mist eliminating systems;

FIG. 2 is a cross-sectional view of baffles of a mist eliminator according to a first embodiment of the invention;

FIG. 3 is a fragmentary sectional view showing a modification of the baffle design of FIG. 2 in the front area;

FIG. 4 is another embodiment of the baffles of a mist eliminator in accordance with the invention;

FIG. 5 is another embodiment of the baffles of a mist eliminator according to the invention;

FIG. 6 is still another modified embodiment of the baffles of a mist eliminator according to the invention.

FIG. 7 is a cross sectional view of another modification of the invention.

DETAILED DESCRIPTION

FIGS. 1-1 through 1-9 illustrate diagrammatically a number of baffle-type mist eliminating systems having flow deflecting portions enforced by carved baffles, the droplets contained in the gaseous flow being "flung out" towards the baffle surfaces. The liquid films formed thereby flow along the baffle surfaces under the action of gravity into a collecting tank.

Referring now to FIGS. 2-6, there are shown different mist eliminator configurations in accordance with the present invention, which mist eliminators include an entrance plane E, an exit plane A, a pitch or centre distance T of the baffles, the overall baffle length L, heights of the capture pocket openings $h_1$ (first capture pocket) and $h_2$ (second capture pocket), radii of curvature $r_1$ to $r_4$ of different portions of the baffle, width $b_1$ of the orthogonal projection of the front region of the baffle, the width $b_2$ of the main flow passage in the exit region, and width $b_3$ of a quiescent flow region on the exit side of the baffles (see FIG. 5), and furthermore with the recess $l_1$ of the entrance edge of the capture blade of the first capture pocket, the recess $l_2$ of the branching-off point of said capture blade of the baffle, and the recess $l_3$ of the entrance edge of the second capture blade.

The ratio of the centre distance T between adjacent baffles to the overall baffle length L should be chosen in accordance with the required mist eliminating characteristic.

Figures 2, 3:
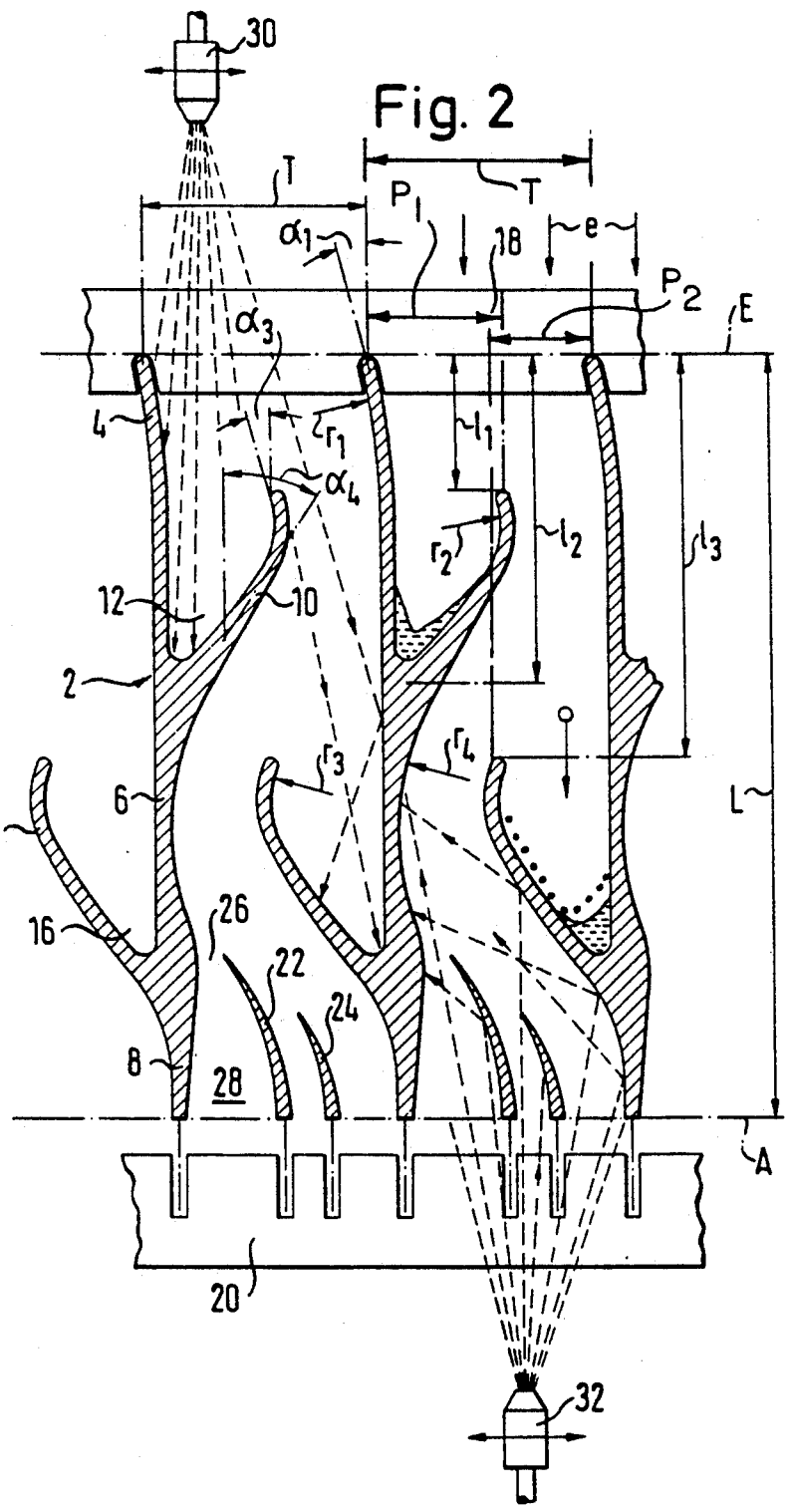

The angle $\alpha_1$ indicates the inclination of the tangent to the centre line of the baffle in the front region thereof relative to the line normal to the entrance plane E (FIG. 2). $\alpha_1$ should be kept relatively small so as to prevent a detrimental droplet reflection from the baffle.

Figure 5:
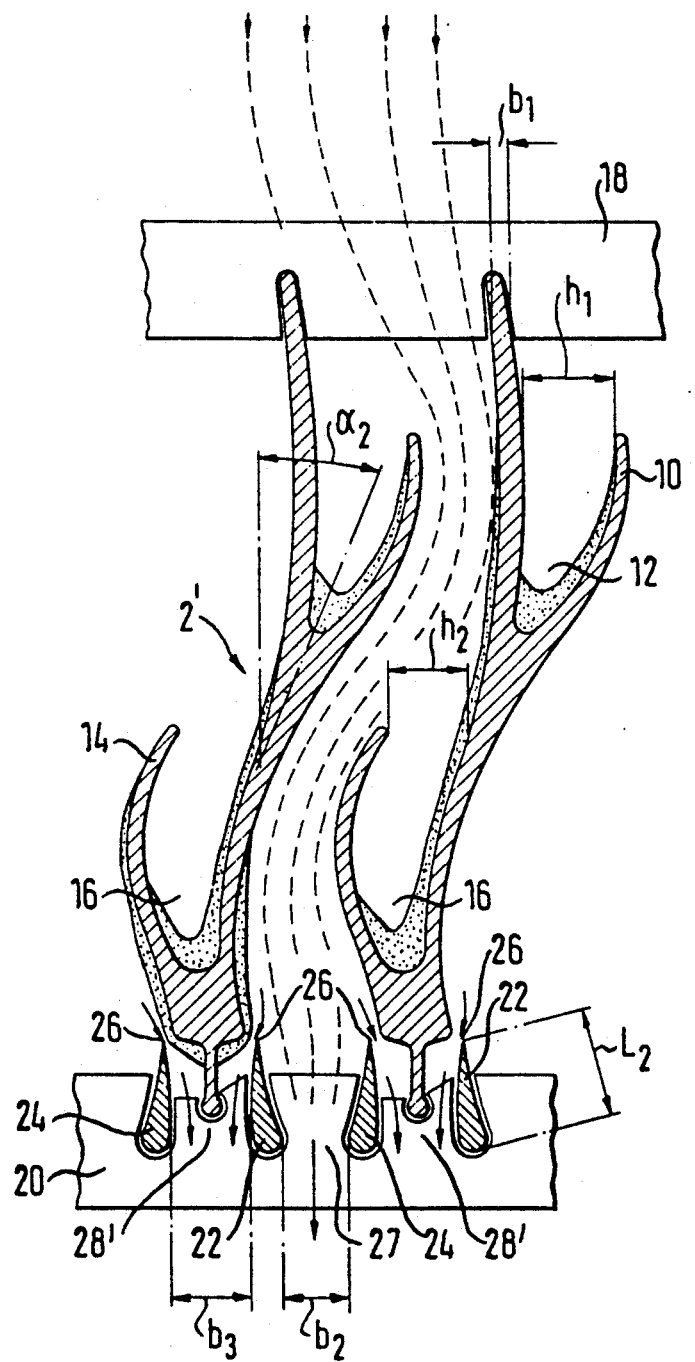

The angle $\alpha_2$ describes the inclination of the main baffle to the line normal to the entrance plane E in the turning point of the baffle curvature (FIG. 5, tangent to the turning point).

The angle $\alpha_3$ indicates the inclination of the tangent to the centre line of the first capture blade relative to the line normal to the entrance plane. For the rest, the statements made in respect of the angle $\alpha_1$ will apply.

The angle $\alpha_4$ indicates the inclination of the tangent to the turning point of the first capture blade relative to the line normal to the entrance plane E. This angle should be dimensioned to match the chosen ratio T/L.

Dimensional and angular ranges as well as preferred values for the above-indicated parameters will be apparent from the following Table 1.

TABLE 1 control variation ranges of the significant dimensions and of preferred values,

| Term | abridged notation | range | preferred value | preferred values based on T |
|---|---|---|---|---|
| baffle pitch | T | 20-100 mm | 45 mm | 1 |
| length of main baffle | L | 70-300 mm | 180 mm | 4 |
| recess capture blade 1 | $l_1$ | 0-60 mm | 30 mm | 0,67 |
| recess of coupling of capture blade 1 | $l_2$ | 20-100 mm | 65 mm | 1,44 |
| recess of coupling of capture blade 2 | $l_3$ | 40-120 mm | 75 mm | 1,67 |
| over-curvature of main baffle at the entrance | $b_1$ | 0-15 mm | 7 mm | 0,16 |
| width of main passage between two final blades | $b_2$ | 10-50 mm | 20 mm | 0,44 |
| width of quiescent area behind main baffle | $b_3$ | 5-30 mm | 15 mm | 0,33 |
| height of capture pocket 1 | $h_1$ | 5-40 mm | 20 mm | 0,44 |
| height of capture pocket 2 | $h_2$ | 5-40 mm | 17 mm | 0,38 |
| radius of curvature of main baffle in front region | $r_1$ | 30-200 mm | 150 mm | 3,33 |
| radius of curvature of capture blade 1 in front region | $r_2$ | 10-80 mm | 30 mm | 0,67 |
| radius of curvature of capture blade 2 in front region | $r_3$ | 10-80 mm | 30 mm | 0,67 |
| radius of curvature of main baffle in rear region | $r_4$ | 30-200 mm | 80 mm | 1,78 |
| length of a final blade | $L_2$ | 15-50 mm | 25 mm | 0,56 |
| pitch ratio | T/L | 0,1-0,5 | 0,25 | 0,25 |
| angle between tangent to skeleton line of main baffle and the orthogonal to the entrance plane | $\alpha_1$ | 0-30 | 10 | |
| angle between the turning-point tangent to the main baffle and the orthogonal to the entrance plane | $\alpha_2$ | 0-45 | 15 | |
| corresponding to $\alpha_1$ for the first capture blade | $\alpha_3$ | 0-30 | 10 | |
| angle between the turning-point tangent to the first capture blade and the orthogonal to the entrance plane | $\alpha_4$ | 20-50 | 40 | |

The parameter ranges indicated above and specified numerically in Table 1 shall apply to all embodiments.

Below, further features of these embodiments will be described, especially with a view to the differences between such embodiments. Nevertheless, for the sake of simplicity the same reference symbols are being used for identical parts or parts having similar functions.

Each of the baffles generally referenced 2 comprises a front region 4 slightly set at the angle $\alpha_1$, a middle region 6 extending substantially normal to the entrance plane, and an exit region 8. In the front region 4, a first capture blade 10 is branched off from one side of the baffle 2 to form a first capture pocket 12 which is set at an angle $\alpha_3$ in the front region while it extends at an angle $\alpha_4$ relative to the line normal to the entrance plane E in the vicinity of the turning point of the curvature thereof. A second capture blade 14 is branched off on the other side of the baffle 2 from a location between the middle region 6 and the exit region 8 to form a capture pocket 16. The front region of the capture blade 14 as well as the tangent to the turning points are inclined at identical angles $\alpha_3$ and $\alpha_4$, respectively, as in the case of the first capture blade 10 but in opposition thereto.

The front regions 4 of all baffles are supported in an entrance-side spacer member 18, while the exit regions 8 of the baffles are supported in an exit-side spacer member 20. In said exit region, a larger final blade 22 and adjacent thereto a smaller final blade 24 are disposed between two adjacent baffles. Thereby a constriction 26 is formed through which liquid that has reached the back of the baffle may pass and drain off. Behind the constriction the passage between the baffle 2 and the final blade 22 widens to such an extent that the gas flow velocity is greatly retarded and the liquid in the thus formed quiescent space 28 may drain off due to the action of gravity, which is caused by the baffles being disposed vertically or at least being inclined with a vertical component.

The mist eliminator illustrated in all figures is normally approached by the liquid-laden gas in the direction of the arrows e. It will be apparent that the orthogonal projections $P_1$ and $P_2$ of the openings of the pockets 12 and 16 spans practically the entire width (corresponding to the pitch T) of the entrance plane so that the main portion of the large drops will be captured in the capture pockets 12, 16.

Furthermore, the capture pockets 12, 16 may be cleaned by a flushing jet which can be introduced by means of a fan nozzle 30 adapted to be movable in parallel to the entrance plane.

At the exit side a fan nozzle 32 may likewise be disposed for movement in parallel to the exit plane A so as to flush the final blades 22, 24 and the baffle walls in the exit region and to keep them free from harmful deposits or incrustations.

The described flushing operations may also be performed in operation, i.e. during effective flow in the direction of the arrows e.

The embodiment illustrated in FIG. 3 differs from that shown in FIG. 2 merely in that the front region, which is inclined at the angle $\alpha_1$ and curved at a radius $r_1$ and which projects forwardly by the length $l_1$ relative to the tip of the first capture blade 10, is configured as a separate front baffle 4' which is supported in the entrance-side spacer member 18' separate from the baffle 2.

Figure 4:
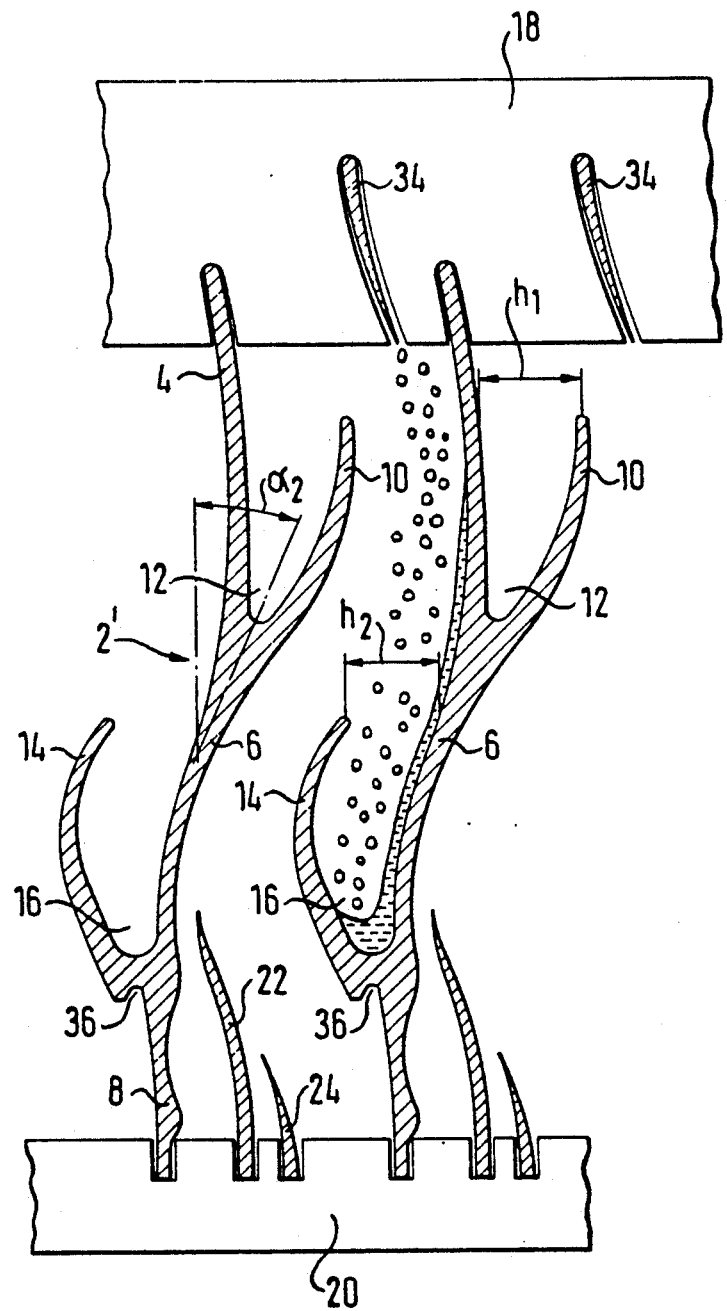

The embodiment illustrated in FIG. 4 first of all differs from that shown in FIGS. 2' and 3 in that the baffle 2' has a sinusoidal-wave shape while its longitudinal axis is inclined at the turning point relative to the line normal to the entrance plane at an angle $\alpha_1$ other than zero.

Also, a preliminary blade 34 is supported in the spacer member 18 for the baffles in the entrance region between two respective baffles. This preliminary blade directs the entrant flow so that the droplets are controlledly directed into the pocket 16 insofar as they have not already been collected in the pocket 12. In particular, droplets which have been separated by the rear edge of the preliminary blade 34 are directed into the pocket 16.

It is a further difference of the embodiment shown in FIG. 4 that on the rear side of the second capture pocket 16 there is provided a collecting flute 36 for diverting drained strands of liquid.

The embodiment illustrated in FIG. 5 differs from that shown in FIG. 4 mainly by a different configuration in the exit region 8. In this case, the final blades 22 and 24 are disposed and profiled such that the cross-section of the main flow passage tapers nozzle-fashion towards the exit. The pressure distribution generated thereby with adapted dimensioning has the effect that a small gaseous stream passes through the constrictions 26 between the final blades and the baffle 2 and transports the liquid film into the quiescent space 28' between the final blades 22, 24 and the baffle 2 where it may drain off smoothly under the action of gravity. It will be evident that this embodiment can also be conveniently and directly cleaned by flushing jets both from the entrance and from the exit side.

Figure 6:
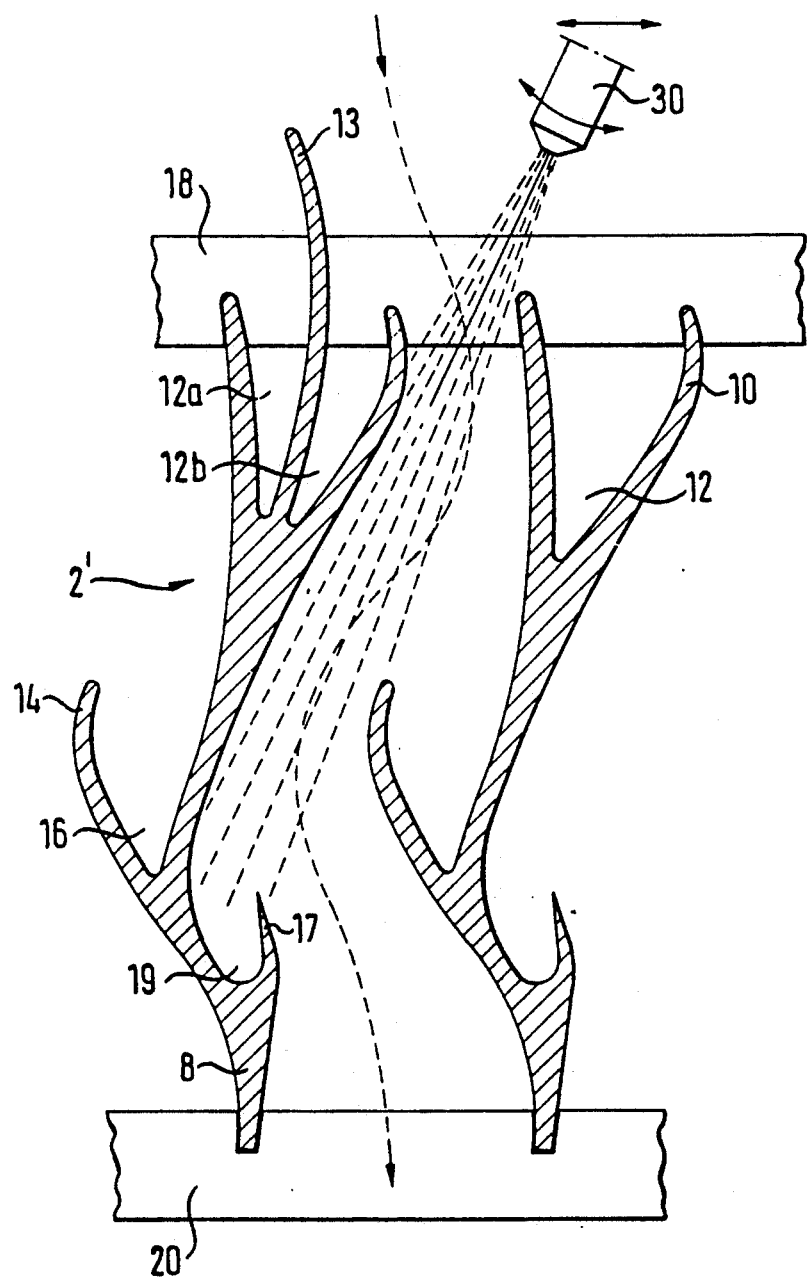

In the embodiment shown in FIG. 6, a small third capture pocket 19 is provided behind the second capture pocket 16 in the direction of flow, the capture blade 17 of said pocket branching off the exit region 8 of the baffle 2 from the same side as the first capture blade 10. The arrangement is such that this third capture blade can also be cleaned easily from the entrance side, although in this case an inclined setting of the fan nozzle 30, which is movable in parallel to the entrance plane, is required so that the flushing jet can be fully directed into the capture pocket 17.

The left-hand baffle 2 in FIG. 6 illustrates a modification with a tongue-like extension 13 of the main branch of the baffle 2 in forward direction beyond the spacer member 18, the extension dividing the front pocket into a left and a right half 12a, 12b.

In the embodiment of FIG. 7, the baffle is hollow and is internally supplied with water at a temperature below the dew point of the gas flowing through the mist eliminator.

I claim:

1. A mist eliminator for removing droplets from a solids-laden and/or liquid-laden gaseous flow, comprising:
   (a) a plurality of baffles (2) each having forward end (4), intermediate (6) and rear end (8) portions, and a plurality of forwardly-directed laterally-outwardly-extending longitudinally-spaced pockets (12, 16) arranged on said intermediate portion;
   (b) means (18, 20) supporting said baffles in a parallel spaced arrangement with the front extremities of said forward end portions being contained in a common entrance plane (E) which extends normal to the direction (e) of said gaseous flow;
   (c) the pockets between each pair of said baffles having orthogonal projections ($P_1$, $P_2$) on said entrance plane that are at least as great as the distance (T) between the centers of said baffle pair.

2. A mist eliminator as defined in claim 1, and further including at least one final blade (22, 24) arranged between the rear end portions of said baffle pair to define at least one rearwardly open quiescent area (28, 28').

3. The mist eliminator as claimed in claim 2, in which a pair of said final blades (22, 24) are disposed relative to said baffles (2) such that the liquid eliminated on said baffles (2) is sucked into said quiescent areas.

4. The mist eliminator as claimed in claim 2, in which only one final blade (22) is provided for each baffle (2).

5. The mist eliminator as claimed in claim 2, in which two final blades (22, 24) are provided for each baffle (2), said final blades (22, 24) preferably being profiled and set at angles relative to the longitudinal axes of said baffles such that the cross-section of the main flow passage (27) between two respective adjacent final blades tapers to define a nozzle configuration.

6. The mist eliminator as claimed in claim 1, wherein said forward end (4) of at least one of said baffles extends forwardly beyond the entrance edge of the adjacent pocket a distance ($l_1$) that is from 0.5T to 2T based on the pitch or center distance (T) between adjacent baffles.

7. The mist eliminator as claimed in claim 6, in which the front region is configured as a front baffle (4') which is separate from the baffle and together with the baffle (2) is retained in a common spacer member (18') on the side of the approaching flow.

8. The mist eliminator as claimed in claim 1, characterized in that each baffle (2) comprises three capture pockets (12, 16, 19) which are disposed such that all of them can be cleaned directly from the entrance side of the mist eliminator by means of angularly adjustable fan nozzles (30).

9. The mist eliminator as claimed in claim 8, in which the capture pocket (12) which is the first one in the direction of the approaching flow is disposed in the front region of the baffle (2).

10. The mist eliminator as claimed in claim 9, characterized in that capture pockets (12, 16) are disposed on either side of the front region of each baffle.

11. The mist eliminator as claimed in claim 8, characterized in that on the approaching flow-side at least one preliminary blade (34) is disposed between adjacent baffles (2) for directing the droplets into easy-to-clean areas of the baffles.

12. The mist eliminator as claimed in claim 1, in which the capture pocket (12) which is the first one in the direction of the approaching flow is disposed in the front region of the baffle (2).

13. The mist eliminator as claimed in claim 1, characterized in that on the approaching flow-side at least one preliminary blade (34) is disposed between adjacent baffles (2) for directing the droplets into easy-to-clean areas of the baffles.

14. The mist eliminator as claimed in claim 13, in which the preliminary blade (34) is fixed on the approaching flow-side of the mist eliminator in a spacer member (18) provided on the approaching flow-side.

15. The mist eliminator as claimed in claim 1, characterized in that the baffles (2) are configured as hollow sections and are internally supplied with water at a temperature below the dew point of the gas flowing through the mist eliminator.

* * * * *